United States Patent
Alié et al.

(10) Patent No.: US 6,659,148 B1
(45) Date of Patent: Dec. 9, 2003

(54) BEAD REINFORCING STRUCTURE FOR RADIAL TRUCK TIRES

(75) Inventors: Jean-Claude Alié, Bastogne (BE); Michèle Marie Joseph Emile Spriet, Brussels (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/857,249

(22) PCT Filed: Dec. 1, 1998

(86) PCT No.: PCT/US98/25473
§ 371 (c)(1),
(2), (4) Date: May 30, 2001

(87) PCT Pub. No.: WO00/32424
PCT Pub. Date: Jun. 8, 2000

(51) Int. Cl.$^7$ .......................... B60C 15/00; B60C 15/06; B60C 13/00
(52) U.S. Cl. ....................... 152/539; 152/541; 152/542; 152/543; 152/546; 152/555
(58) Field of Search .................. 152/539, 541, 152/542, 543, 546, 555

(56) References Cited

U.S. PATENT DOCUMENTS

| | | |
|---|---|---|
| 1,682,922 A | 9/1928 | McKone |
| 2,131,638 A | 9/1938 | Nellen |
| 2,501,372 A | 3/1950 | Benson |
| 2,902,073 A | 9/1959 | Lessig |
| 2,958,360 A | 11/1960 | Macklem et al. |
| 2,989,614 A | 6/1961 | Steigerwald |
| 3,028,903 A | 4/1962 | Lessig |
| 3,253,693 A | 5/1966 | Ayres, Jr. |
| 3,638,705 A | 2/1972 | Devienne et al. |
| 3,901,751 A * | 8/1975 | Wilson .................. 156/133 |
| 4,024,901 A | 5/1977 | Poque |
| 4,046,183 A | 9/1977 | Takahashi et al. |
| 4,047,551 A | 9/1977 | Mezzanotte |
| 4,234,029 A | 11/1980 | Peter et al. |
| 4,289,184 A | 9/1981 | Motomura et al. |
| 4,295,511 A | 10/1981 | Mezzanotte et al. |
| 4,319,621 A | 3/1982 | Motomura et al. |
| 4,357,976 A | 11/1982 | Mezzanotte et al. |
| 4,462,448 A | 7/1984 | Kawaguchi et al. |
| 4,667,722 A | 5/1987 | Klepper et al. |
| 4,941,523 A * | 7/1990 | Galante et al. .............. 152/543 |
| 5,309,971 A | 5/1994 | Baker et al. |
| 6,129,128 A * | 10/2000 | Fukumoto .................... 152/543 |

FOREIGN PATENT DOCUMENTS

| | | |
|---|---|---|
| EP | 573853 | * 12/1993 |
| FR | 2312383 | 5/1976 |
| JP | 05077616 A1 | 3/1993 |

* cited by examiner

Primary Examiner—Adrienne C. Johnstone
Assistant Examiner—Justin Fischer
(74) Attorney, Agent, or Firm—Howard M. Cohn

(57) ABSTRACT

The tire of the invention incorporates an active nylon flipper in each bead region. The flipper is active in the sense that it actively absorbs differential shearing strains that arise between each turnup end of the ply and each rigid metal bead during heavy-duty service. In conjunction with each of the two flippers, a chipper protects the portion of the ply lying closest to the wheel rim when the tire is mounted. A nylon patch overlaps the respective end of each chipper, the turnup end of the ply, and the radially outermost part of each flipper. The shearing modulus of the nylon material of each flippers and each patch is intermediate between the shearing moduli of the adjacent materials, which thus distributes and absorbs shearing stresses in ways that reduce the tendency of the turnup ends and the radial most part of the chippers to separate from the adjacent tire structures during heavy-duty operation.

15 Claims, 3 Drawing Sheets

BEAD REINFORCING STRUCTURE FOR RADIAL TRUCK TIRES

TECHNICAL FIELD

The present invention relates to pneumatic tires for trucks and more particularly to means of preventing separation of ply turnup ends.

BACKGROUND OF THE INVENTION

A pneumatic vehicle tire typically includes a pair of axially separated inextensible beads. A circumferentially disposed bead filler apex extends radially outward from each respective bead. At least one carcass ply extends between the two beads. The carcass ply has axially opposite end portions, each of which is turned up around a respective bead and secured thereto. Tread rubber and sidewall rubber is located axially and radially outward, respectively, of the carcass ply.

The bead area is one part of the tire that contributes a substantial amount to the rolling resistance of the tire, due to cyclical flexure which also leads to heat buildup. Under conditions of severe operation, as with truck tires, the flexure and heating in the bead region can be especially problematic, leading to separation of mutually adjacent components that have disparate properties such as the respective moduli of elasticity. In particular, the ply turnup ends are prone to separation from adjacent structural elements of the tire. More specifically, the ply is reinforced with materials such as nylon, polyester, rayon and metal which have much greater stiffness (i.e., modulus of elasticity) than does the adjacent rubber compound of which the bulk of the tire is made. The difference in elastic modulus of mutually adjacent tire elements leads to separation when the tire is stressed and deformed during use.

A variety of structural design approaches have been used to manage the separation of tire elements in the bead regions of tires. For example, one method has been to provide a "flipper" surrounding the bead and the bead filler. The flipper works as a spacer that keeps the ply from making direct contact with the inextensible beads, allowing some degree of relative motion between the ply, where it turns upward under the bead, and the respective beads. In this role as a spacer, the flipper reduces the inevitable disparities of strain on the ply and on the adjacent rubber components of the tire (e.g., the filler apex, the sidewall rubber, in the bead region, and the elastomeric portions of the ply itself).

The flipper is often made of a square woven cloth that is typically a textile in which each fiber, thread or cord has a generally round cross-section. When the flipper is cured in the tire, the stiffness of the fibers/cords becomes essentially the same in any direction within the plane of the textile flipper.

Examples of flippers are found in U.S. Pat. Nos. 2,489,614 and 3,253,693. The latter Patent also discloses data on radial and circumferential deformations within the tire. Such deformations result in shearing stresses during normal operation of the tire, but especially during severe operating conditions. Circumferentially directed shear deformations correlate with high shearing stresses within portions of the tire where the flippers overlap the radially oriented cords that reinforce the ply.

Also, given that the ply is, on each side of the tire, clamped around, or anchored to, or "turned up" about, the respective bead, there exists a "turn-up end" (as viewed in the cross section of a tire) that extends radially outward within, and circumferentially about, each sidewall. Limits on the length of the ply turnup ends are made in order to locate the ends of the ply in positions where radial deformations of the tire are relatively small. Generally the ends of the turnup ends of the ply do not extend beyond one third of the interior section height of the tire (i.e., the section height as measured from the nominal rim diameter to the inner diameter of the tire at its equatorial plane).

Stresses that result in the deposition of energy (i.e., the generation of heat) in the bead region and in the region where the turnup ends terminate are frequently accompanied by strains that contribute to separation failures at the turnup ends. A balanced design for a reinforced bead assembly of a tire has stress characteristics that lead to reduced flexural energy generation (heat buildup) and to strain characteristics that can be uniformly borne by mutually adjacent tire components in the bead region, including the turnup ends.

More particularly, radial-ply truck tires in which the one or more plies are reinforced with steel fibers or cords are prone to ply ending or turnup separation when exposed to severe service. Part of the cause of separation is related to the stresses described above and to the disparate moduli of elasticity of the respective metal and adjacent polymeric rubber compounds. As the tire undergoes flexure during heavy-duty use, flexure of the sidewalls in the region near to and immediately radially outward of the beads experience repeated flexural deformations in one or more directions, such as the radial and axial directions. Ply separation is especially problematic if the tire is overinflated or underinflated.

Prior to the use of steel-reinforced radial ply construction, the plies were reinforced with materials having substantially lower moduli of elasticity than that of steel. Accordingly, the stresses associated with heavy-duty tire use were more easily accommodated by the respectively adjacent components, such as the ply reinforcing materials and the adjacent rubber polymeric materials. (Such tires were, of course, less durable than are those having metal reinforced plies.) Still, disparities of respective moduli of elasticity could lead to ply separation under severe conditions, especially in region near the ply endings.

In addition to the use of flippers as a means by which to reduce the tendency of a ply to separate, another method that has been used involves the placement of "chippers." A chipper is a circumferentially deployed metal or fabric layer that is disposed within the bead region in the portion of the tire where the bead fits onto the wheel rim. More specifically, the chipper lies inward of the wheel rim (i.e., toward the bead) and outward (i.e., radially outward, relative to the bead viewed in cross section) of the portion of the ply that turns upward around the bead. Chippers serve to stiffen, and increase the resistance to flexure, of the adjacent rubber material which itself is typically adjacent to the turnup ply endings.

Examples of patents of prior art uses of flippers and/or chippers are as follows:

U.S. Pat. No. 5,309,971 (Baker et al)
U.S. Pat. No. 4,667,722 (Klepper et al)
U.S. Pat. No. 4,462,448 (Kawaguchi et al)
U.S. Pat. No. 4,357,976 (Mezzanotte)
U.S. Pat. No. 4,289,184 (Motomura et al)
U.S. Pat. No. 4,047,551 (Mezzanotte)
U.S. Pat. No. 4,046,183 (Takahashi et al)
U.S. Pat. No. 4,024,901 (Pogue et al)
U.S. Pat. No. 3,638,705 (Devienne et al)

U.S. Pat. No. 3,028,903 (Lessig)
U.S. Pat. No. 2,958,360 (Mcacklem et al)
U.S. Pat. No. 2,902,273 (Lessig)
U.S. Pat. No. 2,501,372 (Benson)
U.S. Pat. No. 2,131,636 (Nellen)
U.S. Pat. No. 1,682,922 (McKone)

The U.S. Pat. No. 4,319,621 (Motomura et al) discloses several embodiments for use of an inventive metal chipper composed of a reinforcing element embedded in rubber and formed of 1 to 50 helically formed metal filaments. The FIG. 4$d$ illustrates an embodiment using the metal chipper ($4_3$), constituted with reinforcing element ($\beta$) composed of the helically formed filaments (6), as a flipper folded around the bead ring (2) from the inside to the outside thereof between the bead ring (2) and the carcass ply (3) and extended upwardly over the upper end of the turn-up portion (3') of the carcass ply (3). A chafer ($5_1$) reinforced with conventional steel cords and chafers ($5_2$ and $5_3$) each reinforced with nylon cords are further arranged outside the carcass ply (3), the turn-up portion (3') of the carcass ply (3) and the metal chipper ($4_3$).

Each of these prior art patents can be distinguished from the present invention in that they do not include one or more of the features discussed below in the Description of the Preferred Embodiment of the present invention.

OBJECTS OF THE INVENTION

It is an object of the present invention to provide a bead region design that can reduce ply ending separation initiation and propagation within radial unisteel tires exposed to severe service conditions.

Generally, another object of the present invention is to reduce the flexural heat buildup associated with the cyclical shearing stresses and concomitant cyclical shearing strains in the bead regions of truck tires exposed to severe operating conditions.

Another object of the present invention is to employ a bead-region design feature, specifically the incorporation of a textile strip (i.e., a circumferentially disposed "patch") over both sides of the ply turnup ends and the radially outermost portions of the chipper so as to reduce deformation and shearing stress gradients and thus improve the tire's overall resistance to initiation and propagation of ply ending separation in the bead region.

It is a further object of the present invention to incorporate in the bead region of truck tires a combination of chippers, active flippers and a textile "patch" (circumferentially disposed axially outward of the ply turnup and the chipper) which operate in relation to one another in such a way as to provide spacers having such physical properties as modulus of elasticity which are intermediate between those of otherwise adjacent materials having significantly different moduli of elasticity (e.g., steel ply reinforcing wires/cords and rubber).

Yet another object of the present invention is to achieve the above objectives by means of the incorporation of a smaller number of components than are used in standard tire constructions wherein gum strips are applied at the radially outermost ply and chipper endings.

SUMMARY OF THE INVENTION

The present invention relates to a pneumatic radial ply tire having a tread, a carcass comprising a radial ply, a belt structure located between the tread and the radial ply, two inextensible beads, and two sidewalls. The ply is reinforced with a high-modulus material, and it is wrapped around the beads with its turnup ends extending radially outward beneath the sidewalls. Nylon fabric flippers are circumferentially disposed to between the beads from the wrapped ply, separating them from direct contact. Chippers made of steel cords are disposed circumferentially between the portion of the ply that wraps around the bead in the portion of the tire bead region that makes direct contact with the wheel rim when the tire is mounted. Nylon fabric patches are circumferentially disposed over the radially outermost reaches of the axially outwardmost parts of the chippers, the ply turnup ends and the flippers, overlapping the ends of each respective part.

BRIEF DESCRIPTION OF THE DRAWINGS

The structure, operation, and advantages of the invention will become more apparent upon contemplation of the following description taken in conjunction with the accompanying drawings, wherein.

DEFINITIONS

Figure 1:
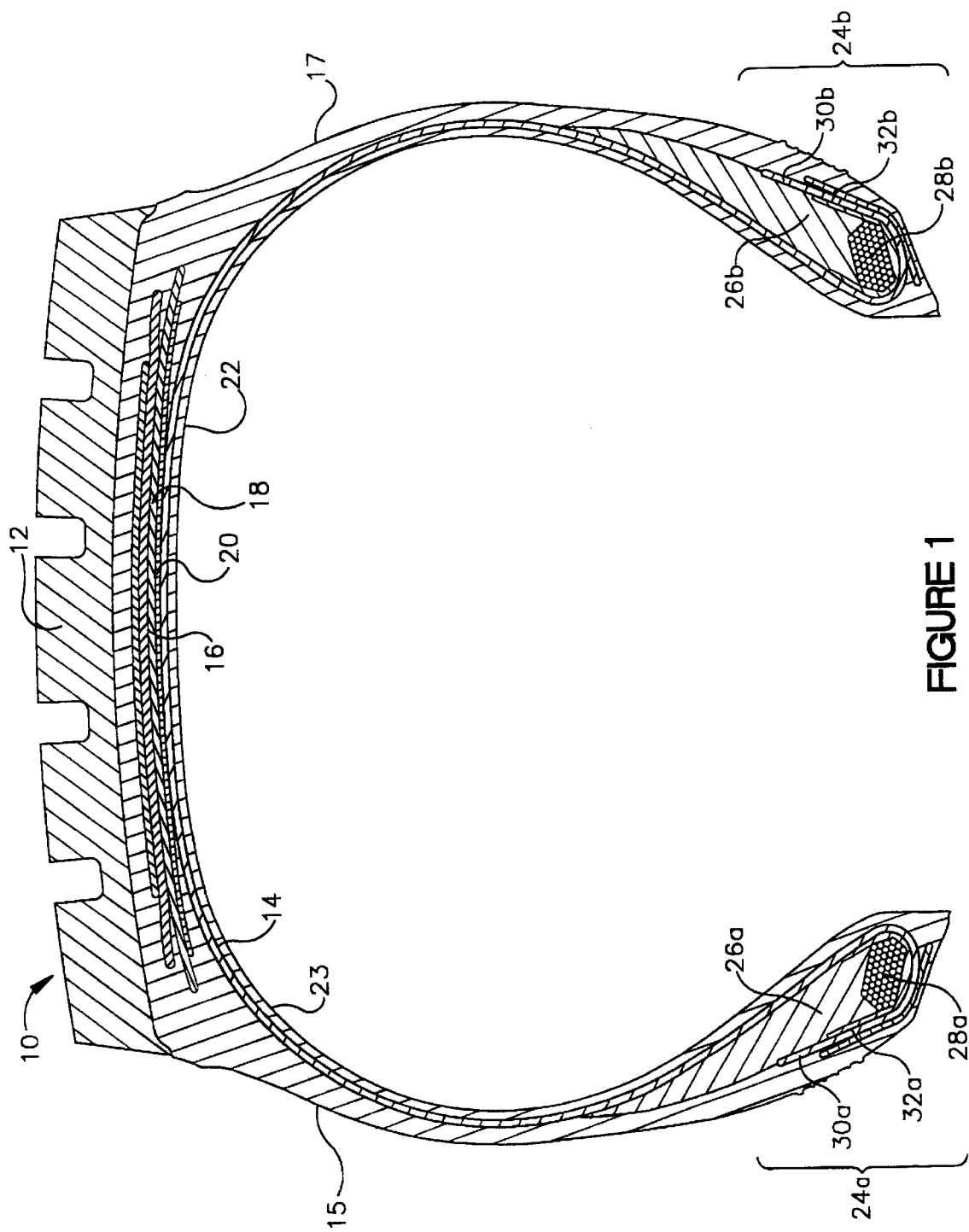
FIG. 1 shows a cross-sectional view of a prior art tire incorporating a flipper.

"Apex" or "bead filler apex" means an elastomeric filler located radially above the bead core and between the plies and the turnup plies.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Carcass" means the tire structure apart from the belt structure, tread, undertread over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Equatorial Plane" means the plane perpendicular to the tire's axis of rotation and passing through the center of its tread; or the plane containing the circumferential centerline of the tread.

"Flipper" refers to a reinforcing fabric around the bead wire for strength and to tie the bead wire in the tire body.

"Gauge" refers generally to a measurement and specifically to thickness.

"Inner Liner" means the layer or layers of elastomer or other material that form the inside surface of a tubeless tire and that contain the inflating fluid within the tire.

"Lateral" means a direction parallel to the axial direction.

"Normal Load" means the specific design inflation pressure and load assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Toe guard" refers to the circumferentially deployed elastomeric rim-contacting portion of the tire axially inward of each bead.

"Tread width" means the arc length of the tread surface in the plane includes the axis of rotation of the tire.

"Turnup end" means the portion of a carcass ply that turns upward (i.e., radially outward) from the beads about which the ply is wrapped.

DETAILED DESCRIPTION OF THE PREFERRED EMBODIMENT

Prior Art Embodiment

FIG. 1 shows in meridional cross-sectional view a prior art tire 10 having a tread 12, a single carcass ply 14, an inner liner 23, belt structure 16 comprising belts 18,20, carcass structure 22, two sidewalls 15,17, and bead regions 24a,24b comprising bead filler apexes 26a,26b and beads 28a,28b. The tire 10 is suitable for mounting on a rim of a vehicle such as a truck. The carcass ply 14 includes a pair of axially opposite end portions 30a,30b, each of which is secured to a respective one of the beads 28a,28b. Each axial end portion 30a or 30b of the carcass ply 14 is turned up and around the respective bead (28b, in FIG. 2) to a position sufficient to anchor each axial end portion 30a,30b.

Figure 2:
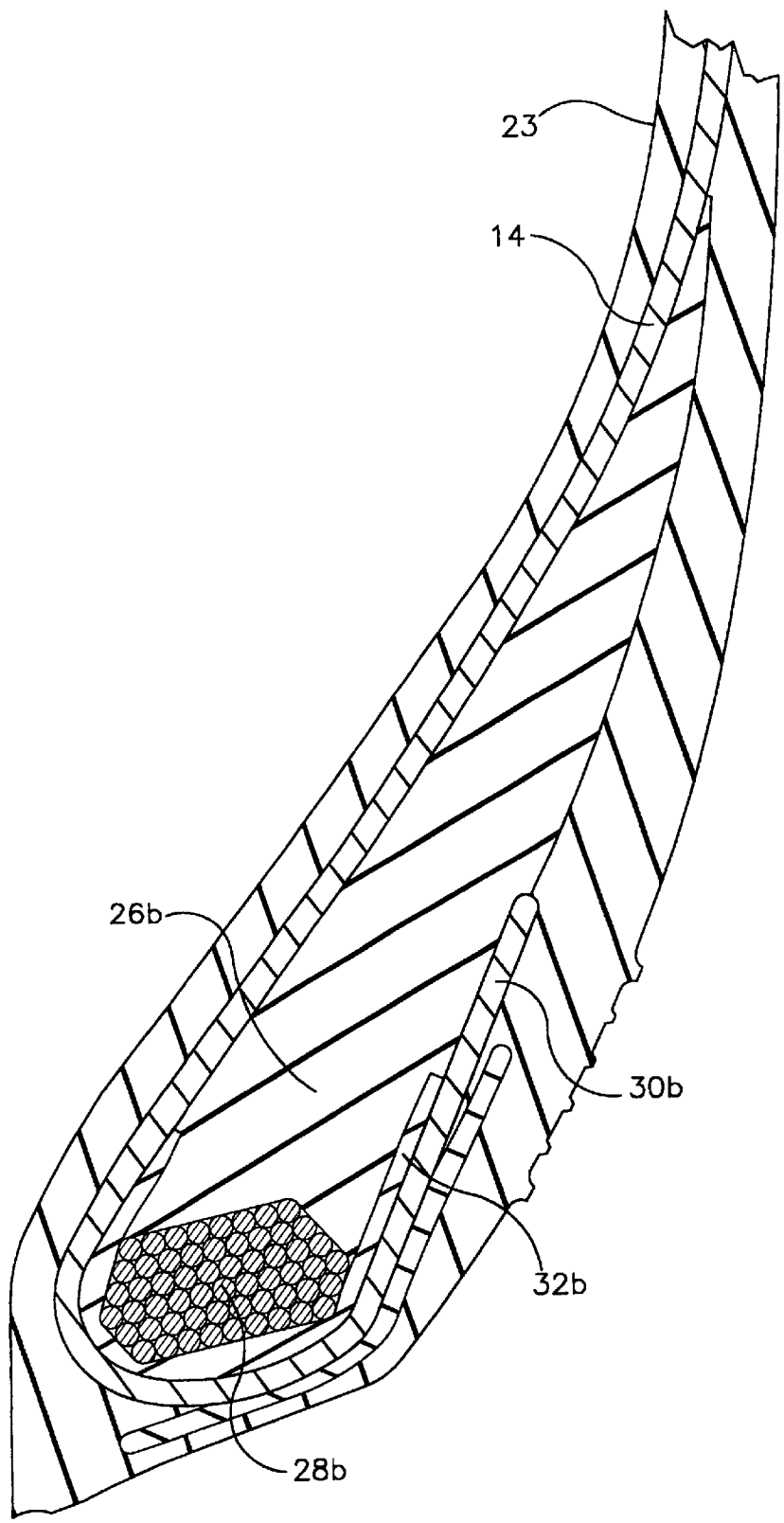
FIG. 2 shows a close up view of the bead region of the prior art tire shown in FIG. 1.

The carcass ply 14 is a rubberized ply having a plurality of substantially parallel extending carcass reinforcing members made of such material as polyester, rayon or similar organic polymeric compounds. The carcass ply 14 engages the axial outer surfaces of the flippers 32a,32b. Flipper 32b is shown in FIG. 2, which shows a close-up detail view of the bead region of the prior art tire 10. Additional prior art tires incorporating chippers and/or flippers are addressed below in relation to the present invention and their respective differences from the present invention.

Summary of the Inventive Features

Figure 3:
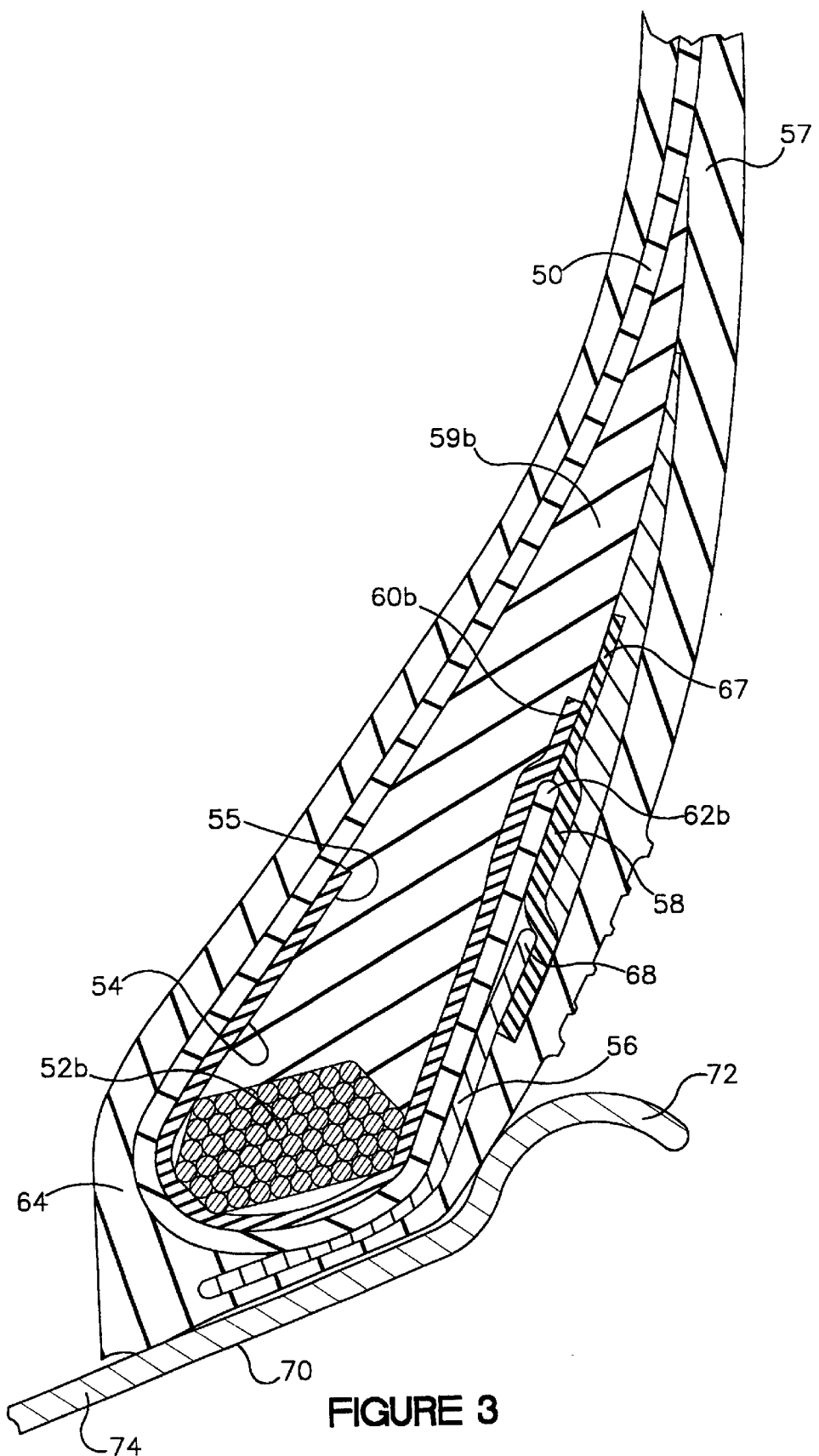
FIG. 3 shows a closeup cross-sectional view of the bead region of the tire according to the present invention.

FIG. 3 shows, in cross-sectional view, the bead region of a tire incorporating the present invention, shown mounted on a wheel rim 70. Carcass ply 50 wraps around bead 52b and is separated from the bead by the flipper 54. The flipper 54 is a fabric layer disposed around the bead wire 52b and inward of the portion of the carcass ply 50 which turns up under the bead. The flipper 54 is made of a material having physical properties (such as shearing modulus of elasticity) that are intermediate between those of the rigid metal bead material and the less rigid material of the carcass ply 50. The flipper 54 therefore serves as an active strain-relieving layer separating the rigid metal beads from the less rigid carcass ply 50. Carcass ply 50 is reinforced with metal as is conventional in the tire art.

FIG. 3 also shows a chipper 56. The chipper 56 consists of a narrow band of steel cloth located in the bead area for the purpose of reinforcing the bead area and stabilizing the axially inwardmost part of the sidewall 57. The flipper 54 and the chipper 56, along with the nylon patch 58 uniting them, are discussed separately below, and then in operational conjunction with one another.

The Flipper

The flipper 54 of the present invention wraps around the bead 52b and extends radially outward into the sidewall regions of the tire. The axially inward portion 55 of flipper 54 terminates within the bead-filler apex 59b. The axially outward portion 60b of the flipper 54 lies radially beyond the turnup end 62b, which itself is located radially beyond the radially outermost reach of the chipper 56 (discussed separately below). The axially outwardmost portions 62b of the turnup ends of the ply 50 extend radially outward by a distance of between about 15 millimeters and about 30 millimeters beyond the top of a wheel rim flange 72 of the wheel rim 70.

The flipper 54 is made of nylon fabric. Nylon is defined herein as an example of thermoplastic polymers capable of extension when woven into fabrics, sheets, etc. of extreme toughness, strength and elasticity. For example, the nylon used in the present invention can have the following physical characteristics: The nylon fabric can be woven, or it can be of a monofilament or even a multifilament type of material in which all the cords run in the same direction. The nylon fabric of the flippers 54 can have a thread pitch of between about 5 and about 30 ends per inch (about 2–12 ends/cm) and an overall thickness in the range of about 0.3 to about 1.2 mm, preferably about 10 to about 20 ends per inch (about 4–8 ends/cm) and 0.5 to about 1.0 mm gauge, and most preferably between about 10 and about 20 ends per inch (about 4–8 ends/cm). The nylon cords of the flipper 54 are oriented at an angle of between about 20 degrees and about 50 degrees with respect to the radial direction, and most preferably at an angle of between 25 degrees and 35 degrees.

As can be inferred from contemplation of FIG. 3, the flipper 54 is deployed about the bead 52b which is itself circumferentially disposed within the tire. The flipper 54 disposed such that its axially inward portion 55 extends radially outward from the bead to a distance which is approximately axially adjacent to the top of the rim flange 72 of a wheel 70. On its axially outward side, the flipper 54 extends radially outward from the bead to a location 60b that is also approximately equal to the height of the wheel's rim flange 72. The radialmost reach of the end 60b of the flipper 54 extends between about 7 millimeters and about 15 millimeters beyond the radialmost reach of the ply turnup end 62b. (The view of the elements of the bead region shown in FIG. 3 are mirror-image symmetric with the corresponding elements of the bead region on the other side of the tire.)

The flipper is called "active" because it actively absorbs (i.e. during tire deflection) the differential strain between the very rigid bead 52b and the less rigid metal reinforced ply 50 by the positioning of the flipper ends relative to the top rim flange level. This will also be the case for the "patch" outward as described later.

The Chipper

The chipper 56 is made of steel cords. Each chipper 56 (one for each bead, only one is shown in FIG. 3) is disposed adjacent to the portion of the ply 50 that is wrapped around the bead 52b. More specifically, the chipper 56 is disposed on the opposite side of the portion of the ply 50 from the flipper 54. The axially inwardmost portion of the chipper 56 lies in the portion of the bead region that, when the tire is mounted on a wheel 70, would lie closest to the circularly cylindrical part 74 of the wheel. The axially and radially outwardmost portion of the chipper 56 lies in the portion of the bead region that, when the tire is mounted on a wheel, would lie inward of the circular portion of the wheel-rim flange 70, being separated from the circular portion of the wheel-rim flange by tire rubber 64. In other words, as can be seen in FIG. 3, the chipper 56 is disposed circumferentially about the radially inwardmost portion of carcass ply 50 where it turns up under the bead 52b. The chipper 56 can extend radially outward, being more or less parallel with the turned up end 62b of the ply 50, for example to a distance of about 10 mm to about 30 mm beyond the radial-most reach of the turned up ends 62b of the ply 50, of the radial-most reach of the turnup end of the ply. There are, of course, two chippers, only one of which is shown in FIG. 3. The disposition of the second chipper (not shown) is mirror-symmetric with respect to the bead-region elements shown in FIG. 3.

The chipper 56 protects the portion of the ply that wraps around the bead from the strains in the rubber that separates the chipper from the wheel rim 70. The chipper 56 reinforces the bead area and stabilizes the radially inwardmost part of the sidewall 57. In other words, the chipper 56, being of a relatively flexible steel cords material encompassed with an elastomeric material, absorbs deformation in a way that minimizes the transmission of stress-induced shearing strains that arise inward from the wheel rim 70, through the rubber portion 64, to the turned up portion 62b of the ply 50 where the chipper is most immediately adjacent to the rigid bead 52b.

In a prior art tire, the radially outermost portion of a chipper, corresponding to 68 in FIG. 3, would be exposed to high shearing stresses in the bead region. The differential shearing strains, between the chipper and the much less rigid adjacent rubber, would tend to induce separation of the chipper end 68 from the adjacent rubber 64. The mode of separation arises from the disparity of the physical properties, in particular the disparity of the respective shear moduli of elasticity, of the chipper material and the adjacent low shear modulus of the rubber. Therefore, among the inventive features of the present invention is the use of a nylon "patch" 58 which overlays the radially outwardmost end 68 of the chipper 56 as well as the radially outermost end 60b of the turned up end 62b of the ply 50.

The chipper 56 of the present invention is made of steel cords having a mesh of between about 10 and about 18 ends per inch, preferably between about 12 and about 16 ends per inch. The wire cord gauge of the chipper is between about 0.6 mm and about 1.5 mm. The chipper cords are oriented at an angle of between about 25 degrees and about 35 degrees with respect to the radially oriented steel cords that reinforce the ply; most preferably it is oriented between about 27 and about 30 degrees.

The Nylon Patch

The nylon patch 58 shown in FIG. 3, is circumferentially disposed about the bead structure 52b in such a way as to over lie the radially outermost regions 68 of the chipper 56 and the turned up ends 62b of the ply 50.

The nylon patch 58 performs a function similar to that of those of the chipper 56 and the active flipper 54. More specifically, the material of the nylon patch, because it has properties of shear modulus of elasticity that are intermediate between those of the low-modulus rubber and the much higher modulus reinforcing materials of the ply 50 and the chipper 56, works to intermediate or absorb shearing stresses in the rubber parts which might otherwise induce separation of the flexible rubber from the less flexible material of the chipper and the ply.

The nylon patch 58 is made of nylon fabric having a thread pitch of between about 5 and about 30 ends per inch (epi) and an overall thickness in the range of about 0.3 to about 1.2 mm, and 0.5 to about 1.0 mm gauge, preferably about 10 to about 20 ends per inch, and most preferably between about 10 and, about 15 ends per inch and 0.5 to 0.8 mm cord gauge. The nylon fibers of the nylon patch 58 are oriented at an angle of about 45 degrees with respect to the angle of the nylon threads of the flipper 54. The radially outwardmost portion 67 of the patch 58 reaches to a minimum level such as extending by at least 5 mm avove the flipper 55 upper end 60b and preferably between 10 and 15 mm. The radially inwardmost portion of the patch overlaps preferably about a minimum of 10 mm with the wire chipper 56.

Operational Dynamics of the Inventive Features

The flipper 54 and the patch 58 serve to provide materials that act as strain buffers between respective tire elements which have disparate shear moduli of elasticity. More specifically, the flipper 54 introduces an intermediate material between the rigid bead 52b and the less rigid bead wrapping portion of the steel reinforced ply 50.

The radially and axially outermost portion 60b of the flipper 54 serves a similar strain-relieving intermediating presence between the axially inwardmost portion of the radially outermost extreme region of the turned up end 62b of the ply 50 and the relatively less rigid (i.e., having relatively lower shear modulus of elasticity) material of the bead filler apex 59b.

The chipper 56 serves a similar, albeit more rigid, intermediating strain reliever disposed between the portion of the ply 50 that wraps around and ascends radially outward from the rigid bead 52b.

Finally, the patch 58, which overlies the radially outer most portions of the turnup ends 62b of the ply 50 and the radially outermost portion 68 of the chipper 56, likewise presents a strain absorbing presence that intermediates between the high strains of the low-modulus rubber portion 64 and the relatively lower strains of the higher modulus materials respectively of the ply end 62b and the chipper end 68.

The net effect of the incorporation of the combined inventive features of the steel cords chipper 56 and the flipper 54 and the patch 58 is a set of strain buffers that relieve or absorb the kinds of differential shearing strains that otherwise, were the chippers, flippers and patches not present, would more likely lead to separation of the adjacent materials having disparate shearing moduli of elasticity. Furthermore, this reinforced construction results in increased durability of the tire by means of the incorporation of a smaller number of components than for standard constructions with gum strips at ply and chipper ending.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply tire having a tread, two inextensible annular beads, a radial ply structure, the radial ply being wrapped around the beads and having turnup ends, a belt structure located between the tread and the radial ply structure, two sidewalls, and an inner liner, the tire being characterized by:
    a flipper made of nylon fabric, disposed between each bead and the respective ply turnup end;
    a chipper made of steel cords, disposed on the opposite side of the ply from each flipper and adjacent to the portion of each ply turnup end that most closely approaches portions of a wheel rim when the tire is mounted on the wheel rim; and
    a patch made of nylon fabric, disposed to overlie against the radially outermost portion of each chipper and to overlie against the radially outermost portion of each ply turnup end.

2. The tire of claim 1 in which the axially outermost portions of the turnup ends of the ply extend radially outward by a distance of between about 15 millimeters and about 30 millimeters beyond the top of a wheel rim flange of the wheel rim.

3. The tire of claim 1 in which the axially outermost portion of each flipper extends between about 7 mm and about 15 mm radially beyond the radially outermost reach of the turnup end of the ply.

4. The tire of claim 1 in which each flipper is made of square woven nylon fabric having a thread pitch of between about 5 and about 30 ends per inch (between about 2 and about 12 ends/cm) and an overall thickness in the range of about 0.3 to about 1.2 mm.

5. The tire of claim 4 in which each flipper is made of square woven nylon fabric preferably having a thread pitch of between about 10 and about 20 ends per inch (between about 4 and about 8 ends/cm) and a cord gauge of about 0.5 mm to about 1.0 mm.

6. The tire of claim 1 in which each flipper is made of nylon having cords run in the same direction made preferably of multifilament nylon.

7. The tire of claim 1 in which each flipper is most preferably made of monofilament nylon.

8. The tire of claim 6 in which the nylon cords of each flipper are oriented at an angle of between about 20 degrees and about 50 degrees with respect to the radial direction.

9. The tire of claim 1 in which each patch is made of nylon fabric being formed of a square woven nylon fabric and having a thread pitch of between about 5 and about 30 ends per inch (between about 2 and about 12 ends/cm) and an overall thickness in the range of about 0.3 mm to about 1.2 mm.

10. The tire of claim 9 in which the weave of the cords of each square woven nylon patch is oriented at an angle of about 45 degrees with respect to the cords of the nylon fabric of the respective flipper.

11. The tire of claim 1 in which each patch overlaps the radially outermost portion of each chipper by at least about 10 millimeters.

12. The tire of claim 6 in which the nylon cords of each flipper are oriented at an angle of between 25 degrees and 35 degrees with respect to the radial direction.

13. A pneumatic radial ply tire having a tread, two inextensible annular beads, a radial ply structure, the radial ply being wrapped around the beads and having turnup ends, a belt structure located between the tread and the radial ply structure, two sidewalls, and an inner liner, the tire being characterized by:
    a flipper made of nylon fabric, disposed between each bead and the respective ply turnup end;
    a chipper made of steel cords, disposed on the opposite side of the ply from each flipper and adjacent to the portion of each ply turnup end that most closely approaches portions of a wheel rim when the tire is mounted on the wheel rim; and
    a patch made of nylon fabric, disposed over the radially outermost portion of each chipper and over the radially outermost portion of each ply turnup end; and
    the axially outward portion of the flipper lies radially beyond the turnup end, and the turnup end is located radially beyond the radially outermost reach of the chipper.

14. A pneumatic radial ply tire having a tread, two inextensible annular beads, a radial ply structure, the radial ply being wrapped around the beads and having turnup ends, a belt structure located between the tread and the radial ply structure, two sidewalls, and an inner liner, the tire being characterized by:
    a flipper made of nylon fabric, disposed between each bead and the respective ply turnup end;
    a chipper made of steel cords, disposed on the opposite side of the ply from each flipper and adjacent to the portion of each ply turnup end that most closely approaches portions of a wheel rim when the tire is mounted on the wheel rim; and
    a patch made of nylon fabric, disposed over the radially outermost portion of each chipper and over the radially outermost portion of each ply turnup end; and
    each patch extends between about 10 millimeters and about 15 millimeters radially beyond the radially outermost extent of each flipper.

15. A pneumatic radial ply tire having a tread, two inextensible annular beads, a radial ply structure, the radial ply being wrapped around the beads and having turnup ends, a belt structure located between the tread and the radial ply structure, two sidewalls, and an inner liner, the tire being characterized by:
    a flipper made of nylon fabric, disposed between each bead and the respective ply turnup end;
    a chipper made of steel cords, disposed on the opposite side of the ply from each flipper and adjacent to the portion of each ply turnup end that most closely approaches portions of a wheel rim when the tire is mounted on the wheel rim; and
    a patch made of nylon fabric, disposed over the radially outermost portion of each chipper and over the radially outermost portion of each ply turnup end; and
    each patch overlaps each turnup end of the ply by between about 7 millimeters and about 15 millimeters.

* * * * *